United States Patent [19]

Schmidt et al.

[11] Patent Number: 5,073,100
[45] Date of Patent: Dec. 17, 1991

[54] CLAMP ASSEMBLY

[75] Inventors: Rick A. Schmidt, Menomonee Falls; LaVerne D. Smith, Pewaukee; Russell J. VanRens, Milwaukee, all of Wis.

[73] Assignee: Outboard Marine Corporation, Waukegan, Ill.

[21] Appl. No.: 526,131

[22] Filed: May 18, 1990

[51] Int. Cl.$^5$ .............................. B29C 45/03
[52] U.S. Cl. .................. 425/192 R; 24/270; 403/344; 425/547
[58] Field of Search ............ 81/DIG. 9, 383.5, 57.18; 269/196, 209, 216, 217, 229, 77, 78, 287; 29/244; 74/567, 570; 403/343, 344, 367, 371, 372, DIG. 4, 344; 24/19, 270, 538, 540, 271, 273, 279; 425/542, 547, 190, 594, 595, 192

[56] References Cited

U.S. PATENT DOCUMENTS

| 904,933 | 11/1908 | Brickner | 285/192 |
| 1,088,490 | 2/1914 | Völler | 81/DIG. 9 |
| 2,265,179 | 12/1941 | MacDonald | 285/6.5 |
| 2,538,393 | 9/1948 | Stecher | 285/6.5 |
| 2,711,561 | 6/1955 | Stüdli | 425/595 |
| 2,852,949 | 9/1958 | Arthur | 403/371 |
| 4,468,842 | 9/1984 | Perry et al. | 24/279 |
| 4,827,632 | 5/1989 | Legon | 24/270 |
| 4,863,362 | 9/1989 | Hehl | 425/190 |

FOREIGN PATENT DOCUMENTS 0238635 2/1965 Australia .............. 24/270

Primary Examiner—Willard Hoag
Attorney, Agent, or Firm—Michael, Best & Friedrich

[57] ABSTRACT

A molding assembly comprising a molding apparatus defining a mold cavity, a fill gun communicating with the mold cavity, and a clamp assembly mounted on the molding apparatus for clampingly engaging the fill gun.

16 Claims, 1 Drawing Sheet

CLAMP ASSEMBLY

BACKGROUND OF THE INVENTION

1. Field of the Invention

This invention relates to lost foam molding apparatus. This invention also relates to clamps having a collar, and more particularly, to clamps which tighten a collar around an object.

2. Description of the Prior Art

Clamps which are attached to objects, used to secure cable or the like, previously utilized a sleeve or similar member which was tightened about an object by a screw.

Attention is directed to the following U.S. Patents.

| Pat. No. | Inventor | Issue Date |
|---|---|---|
| 904,933 | Brickner | November 24, 1908 |
| 2,265,179 | MacDonald | December 9, 1941 |
| 2,538,393 | Stecher | January 16, 1951 |

SUMMARY OF THE INVENTION

The invention provides a clamp assembly adapted to clampingly engage an object, the clamp assembly comprising a collar and cam means for selecting clamping the collar around the object.

The invention also provides an assembly comprising a molding apparatus defining a mold cavity, a fill gun communicating with the mold cavity, and means mounted on the molding apparatus for clampingly engaging the fill gun.

A principal feature of the invention is the provision of cam means pivotally mounted on a collar for clamping the collar around an object.

Other principal features and advantages of the invention will become apparent to those skilled in the art upon review of the following detailed description, claims and drawings.

Figure 4:
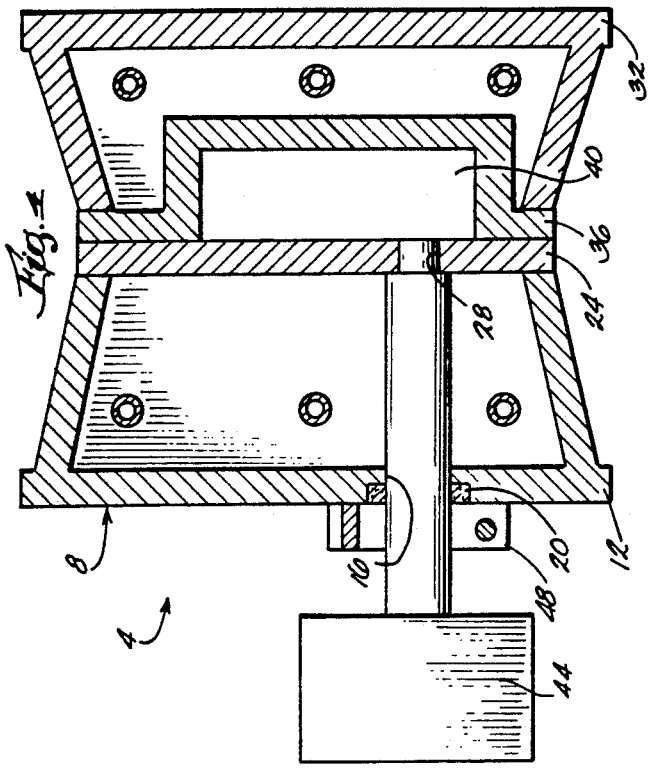
FIG. 4 is a view of the molding assembly taken along line 4—4 in FIG. 1.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DESCRIPTION OF THE PREFERRED EMBODIMENT

A molding assembly 4 embodying the invention is illustrated in the drawings. The assembly 4 comprises (see FIG. 4) a molding apparatus 8 including a left steam chest 12 having therein an aperture 16 and means 20 to seal the aperture 16. The left steam chest 12 supports a left mold piece 24 which has therein an aperture 28. The molding apparatus 8 further includes a right steam chest 32 which supports a right mold piece 36. The mold pieces 24 and 36 define a mold cavity 40 communicating with the aperture 28.

The assembly 4 further comprises a fill gun 44 which is inserted through the aperture 16 in the left steam chest 12 and which communicates with the mold cavity 40 via the aperture 28 in the left mold piece 24.

The assembly 4 further comprises means 48 mounted on the left steam chest 12 for clampingly engaging the fill gun 44. While various suitable means can be employed, in the preferred embodiment, the clamping means 48 includes (see FIG. 1) a clamp assembly 52 comprising a collar 56 mounted on the left steam chest 12 by suitable means such as screws 58. The collar 56 includes a generally semi-circular first portion 60 and a generally semi-circular second portion 64 pivotally connected to the first portion 60. The second portion 64 is fixed to the steam chest 12 by the screws 58, and the first portion 60 is pivotable relative to the second portion 64. The first portion 60 includes a first or upper end 68 and a second or lower end 72 and the second portion 64 includes a first or upper end 76 and a second or lower end 80. Preferably, the collar 56 includes a flexible portion 84 which integrally and pivotally connects the first ends 68 and 76 of the first and second portions 60 and 64. The collar 56 further defines a central bore 88 which is adapted to receive the fill gun 44.

The clamp assembly 52 further comprises means 92 extending through the second ends 72 and 80 of the first and second portions 60 and 64 of the collar 56. While various suitable means can be employed, in the preferred embodiment, the extending means 92 includes an elongated member 96 having spaced-apart first and second or left and right end sections 100 and 104 located outwardly of the first portion 60 and the second portion 64, respectively, and a central section 108 located between the end sections 60 and 64 and extending through the portions 60 and 64. The first section 60 has thereon an enlarged head 112 which prevents passage of the end section 100 through the portions 60 and 64.

Figure 3:
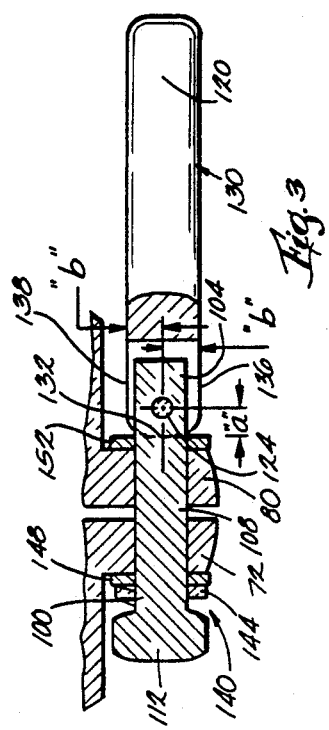
FIG. 3 is a sectional view taken along line 3—3 in FIG. 2.
Figure 1:
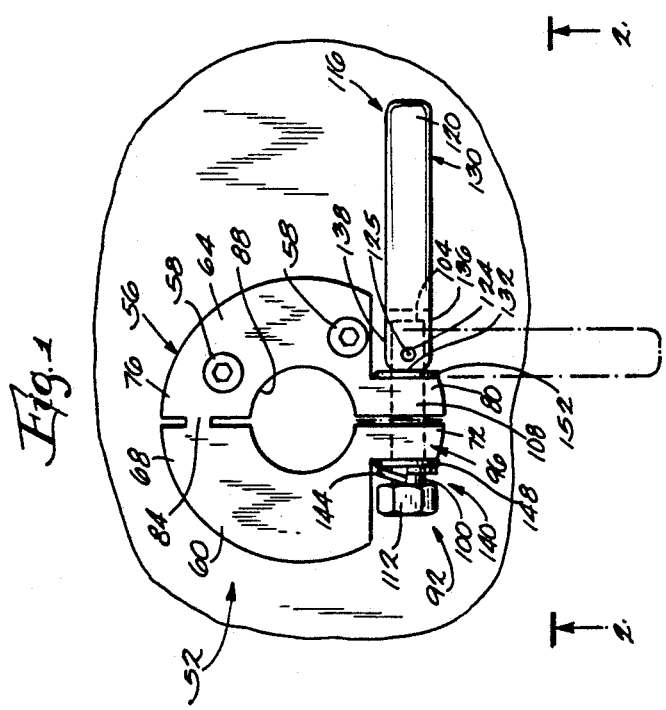
FIG. 1 is a partial front view of a lost foam molding assembly embodying the invention.
Figure 2:
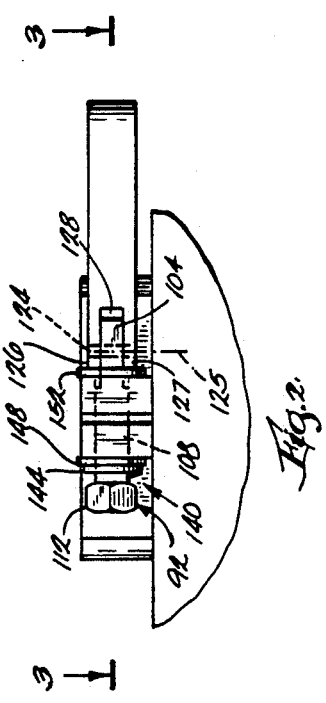
FIG. 2 is a view taken along line 2—2 in FIG. 1.

The clamp assembly 52 further includes cam means 116 mounted on the elongated member 96. The cam means 116 preferably includes a cam lever 120 mounted on the second end section 104 of the elongated member 96 by suitable means such as a dowel 124 for pivotal movement relative thereto about a pivot axis 125. More particularly, the lever includes (see FIG. 2) spaced-apart end portions 126 and 127 defining a slot 128 receiving the end section 104 of the member 96. The dowel 124 extends through the portions 126 and 127 and through the end section 104 of the member 96. The cam lever 120 operates to selectively force the second ends 72 and 80 of the first and second portions 60 and 64 of the collar 56 together and to thereby clamp the collar 56 around the fill gun 44. The cam lever has (see FIG. 3) a cam surface 130 which engages the second portion 64 of the collar 56 and which includes a first or end surface portion 132 spaced a first distance "a" from the pivot axis 125, a second surface portion 136 spaced a second distance "b" greater than the first distance "a" from the pivot axis 125, and a third surface portion 138 spaced the same distance "b" from the pivot axis 125. As shown in FIG. 1, the third surface portion 138 is facing upward and the second surface portion 136 is facing downward. However, the cam lever 120 is designed such that the third surface portion 138 can be facing downward and the second surface portion 136 is facing upward. In this orientation, the third surface portion 138 would engage the second portion 64 of the collar 56 in a similar fashion as shown in phantom in FIG. 1. The cam lever 120 is movable between a first position (shown in solid lines in FIG. 1) wherein the first surface portion 132 engages the second portion 64 of the collar 56, and a second position (shown in phantom in FIG. 1) wherein the second surface portion 136 engages the second portion 64 of the collar 56. The lever is rotated approximately ninety degrees between the first and second positions.

The assembly 52 also includes means 140 for biasing the cam surface 130 into engagement with the second portion 64 of the collar 56. While various suitable means can be employed, in the preferred embodiment, the biasing means 140 includes (see FIG. 1) a spring means, such as a spring washer 144, located between the head 112 and the first portion 60 for biasing the head 112 away from the first portion 60. The spring washer acts through the member 96 and the dowel 124 to bias the lever 120 to the left in FIG. 1. This biasing means 140 substantially prevents the cam lever 120 from "flopping" when the lever 120 is disengaged.

The clamp assembly 52 may also include washers 148 and 152 which surround the member 96 and which respectively engage the first portion 60 and the second portion 64 of the collar 56. The washer 148 is located between the spring washer 144 and the first portion 60 of the collar 56 while the washer 152 is located between the second portion 64 of the collar 56 and the cam lever 120. Thus, when the washer 152 is used, the cam lever 120 actually engages the washer 152 which in turn engages the second portion 64 of the collar 56.

In operation, with the lever 120 in its first position, the fill gun 44 is inserted through the central bore 88 of the clamp assembly 52, and through the aperture 16 in the left steam chest 12, so that the fill gun 44 is in communication with the mold cavity 40 and capable of supplying moldable material to the mold cavity 40. The cam lever 120 is then rotated clockwise to its second position to clamp the collar 56 around the fill gun 44 and to thereby secure the fill gun 44 to the left steam chest 12.

Various features of the invention are set forth in the following claims.

We claim:

1. A clamp assembly adapted to clampingly engage an object, said assembly comprising a collar including a first portion and a second portion pivotally connected to said first portion, an elongated member extending through said portions and having spaced-apart first and second end sections located outwardly of said first and second collar portions, respectively, and a central section which is located between said end sections and which extends through said first and second collar portions, said first end section having thereon an enlarged head, and cam means for selectively clamping said collar around the object, said cam means including a cam lever mounted on said second end section of said member for pivotal movement relative thereto about a pivot axis, said cam lever having thereon a cam surface which engages said second portion and which includes a first surface portion spaced a first distance from said axis, and a second surface portion spaced a second distance greater than said first distance from said axis, and said cam lever being movable between a first position wherein said first surface portion engages said second portion of said collar and a second position wherein said second surface portion engages said second portion of said collar, and means for biasing said cam surface into engagement with said second portion of said collar, said biasing means including spring means located between said head and said first portion for biasing said head away from said first portion.

2. The clamp assembly of claim 1 wherein said first portion and said second portion are semi-circular and each includes respective first and second ends, wherein said first ends of said first and second portions are pivotally connected, and wherein said cam means selectively forces said second ends toward each other.

3. The clamp assembly of claim 2 wherein said collar further includes a flexible portion which integrally and pivotally connects said first ends of said first and second portions.

4. The clamp assembly of claim 1 wherein said collar defines a central bore adapted to receive the object.

5. Injection molding apparatus comprising first and second mold pieces defining a mold cavity, a steam chest having therein an aperture, a fill gun extending through said aperture and communicating with said mold cavity, and means mounted on said steam chest for clampingly engaging said fill gun, said means including a clamp assembly comprising a collar mounted on said steam chest, and cam means for selectively clamping said collar around said fill gun.

6. The assembly of claim 5 wherein said collar defines a central bore receiving said fill gun.

7. The assembly of claim 5 wherein said collar includes a first portion and a second portion pivotally connected to said first portion.

8. The assembly of claim 7 and further comprising means extending through said portions, and wherein said cam means is mounted on said extending means.

9. The assembly of claim 8 wherein said extending means includes an elongated member having spaced-apart first and second end sections located outwardly of said first and second portions, respectively, and a central section which is located between said end sections and which extends through said first and second portions, wherein said first end section has thereon an enlarged head, and wherein said cam means is mounted on said second end section and engages said second portion.

10. The assembly of claim 9 wherein said cam means includes a cam lever mounted on said member for pivotal movement relative thereto about a pivot axis.

11. The assembly of claim 10 wherein said cam lever has thereon a cam surface which engages said second portion and which includes a first surface portion spaced a first distance from said axis, and a second surface portion spaced a second distance greater than said first distance from said axis, and wherein said cam lever is movable between a first position wherein said first surface portion engages said second portion and a second position wherein said second surface portion engages said second portion.

12. The assembly of claim 11 wherein said cam means further includes means for biasing said cam surface into engagement with said second portion.

13. The assembly of claim 12 wherein said biasing means includes spring means located between said head and said first portion for biasing said head away from said first portion.

14. The assembly of claim 7 wherein said first portion and said second portion are semi-circular and each include respective first and second ends, wherein said first ends of said first and second portions are pivotally connected, and wherein said cam means selectively forces said second ends toward each other.

15. The assembly of claim 14 wherein said collar further includes a flexible portion which integrally and pivotally connects said first ends of said first and second portions.

16. A molding assembly comprising a molding apparatus including first and second mold pieces defining a mold cavity, a steam chest having therein an aperture, a fill gun extending through said aperture and communicating with said mold cavity, and means mounted on said steam chest for clampingly engaging said fill gun, said means including a collar including a first portion and a second portion pivotally connected to said first portion, an elongated member extending through said portions and having spaced-apart first and second end sections located outwardly of said first and second collar portions, respectively, and a central section which is located between said end sections and which extends through said first and second collar portions, said first end section having thereon an enlarged head, and cam means for selectively clamping said collar around said fill gun, said cam means including a cam lever mounted on said second end section of said member for pivotal movement relative thereto about a pivot axis, said cam lever having thereon a cam surface which engages said second portion and which includes a first surface portion spaced a first distance from said axis, and a second surface portion spaced a second distance greater than said first distance from said axis, and said cam lever being movable between a first position wherein said first surface portion engages said second portion of said collar and a second position wherein said second surface portion engages said second portion of said collar, and means for biasing said cam surface into engagement with said second portion of said collar, said biasing means including spring means located between said head and said first portion for biasing said head away from said first portion.

* * * * *